US008087989B2

(12) United States Patent
Shimshi

(10) Patent No.: US 8,087,989 B2
(45) Date of Patent: Jan. 3, 2012

(54) APPARATUS FOR MAKING A SOUGHT-AFTER CHOICE MORE LIKELY TO BE OBTAINED BY A PARTICIPANT FROM A GROUP OF CHOICES

(76) Inventor: Ezra Shimshi, Atlanta, GA (US)

( * ) Notice: Subject to any disclaimer, the term of this patent is extended or adjusted under 35 U.S.C. 154(b) by 0 days.

(21) Appl. No.: 12/221,495

(22) Filed: Aug. 4, 2008

(65) Prior Publication Data

US 2008/0300042 A1 Dec. 4, 2008

(51) Int. Cl.
*G06F 17/00* (2006.01)

(52) U.S. Cl. .......................................................... 463/17

(58) Field of Classification Search .............. 463/16–18, 463/21, 22, 42
See application file for complete search history.

(56) References Cited

U.S. PATENT DOCUMENTS

| | | | | |
|---|---|---|---|---|
| 6,364,667 | B1 * | 4/2002 | Heinberg et al. | 434/322 |
| 6,575,831 | B1 * | 6/2003 | Gonen et al. | 463/25 |
| 7,054,831 | B2 * | 5/2006 | Koenig | 705/14.5 |
| 7,344,440 | B2 * | 3/2008 | Gonen et al. | 463/13 |
| 2005/0061881 | A1 * | 3/2005 | Clancey | 235/386 |
| 2007/0233553 | A1 * | 10/2007 | Clancey | 705/12 |
| 2009/0121425 | A1 * | 5/2009 | Berkowitz | 273/139 |

* cited by examiner

*Primary Examiner* — Ronald Laneau

(57) ABSTRACT

The present invention provides mathematical logic in determining the likelihood of the sought-after choice from among a group of choices by dividing the group of choices in two groups to create a small group. Then, mandatory selection from the large group of choices is made. Afterward, random elimination must leave two choices standing, one is the sought-after choice and the second is the mandatory selection, one of which is elected as the likely sought-after choice. If the sought-after choice is also the mandatory selected choice, then the second surviving choice can be any other choice.

6 Claims, 2 Drawing Sheets

APPARATUS FOR MAKING A SOUGHT-AFTER CHOICE MORE LIKELY TO BE OBTAINED BY A PARTICIPANT FROM A GROUP OF CHOICES

FIELD OF THE INVENTION

The invention herein relates to apparatuses and methods that introduce mathematical probability to selection in elections, games, game-shows, e-games and lottery.

BACKGROUND OF THE INVENTION

The present invention provides a method for fair chance of selecting the sought-after choice, which today most selections are based on mere luck. Further, the present invention is also practical because it can be used to supplement, complement and improve games, game-shows, e-games, lottery selection in elections and other social activities.

SUMMARY OF THE INVENTION

The present invention introduces a method by which a sought-after choice among a group of choices can be more likely identify by mathematical probability the steps of: First, dividing the group of choices in two to create a small group. Second, a mandatory selection of one choice is made from the large group of choices. Third, computerized random elimination leaves only two choices standing, which one must be the sought-after choice and the other must be the mandatory selection or any other choice if the sought-after choice is also the mandatory selection. Fourth, election is made between the two remaining choices dependent on which group has been completely eliminated.

DETAIL DESCRIPTION

Figure 1:
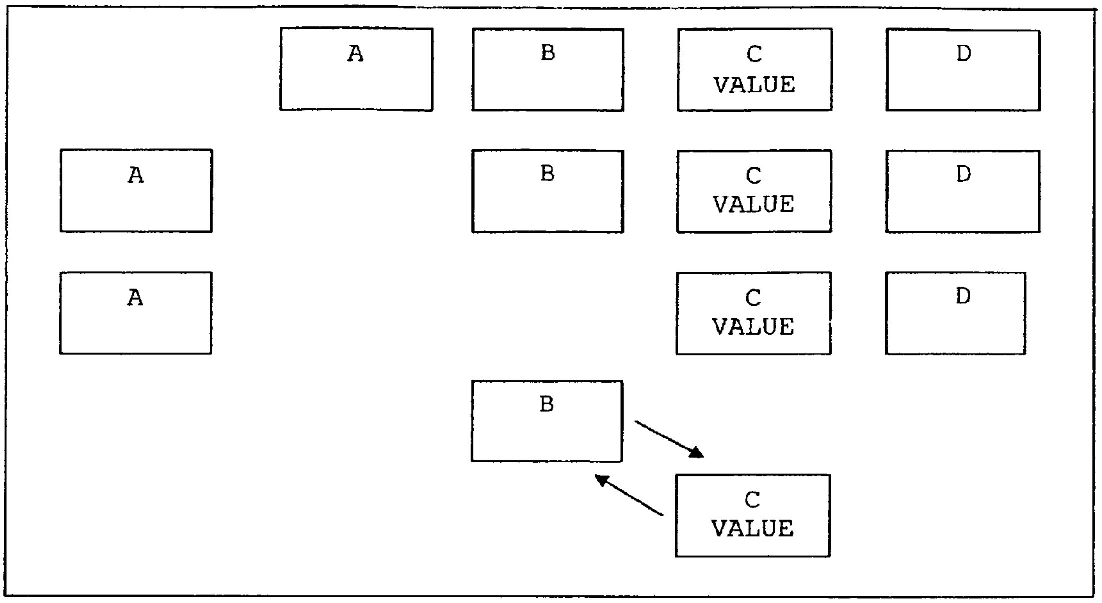
FIG. 1, FIG. 2, FIG. 3 and FIG. 4 are schematic diagrams, each represents the over view of the invention showing a group of choices “A”, “B”, “C” and “D” of which choice “C” is the sought-after choice that randomly is identified as “C” and the word “value” on it visible only through computerized means.

In FIG. 1 a participant who is being challenged to obtain the sought-after choice “C” is asked to make the mandatory selection of a single choice from the group of choices “A“-”D”. The participant, however, first chooses to divide the group of choices in two groups in order to create a small group of choice “A” and only then makes the mandatory selection from the large group of choices, which is choice “B”. In a computerized random elimination that follows, only two choices remain standing, one of them must always be the sought-after choice “C” and the second must always be the mandatory selection, unless the sought-after choice is also the mandatory selection. In such a case the second surviving choice can be any other choice. Finally, the participant has to elect one of the two surviving choices. In FIG. 1 the two choices that have remained after the random elimination are the mandatory selection “B” and the sought-after choice “C”. Since the sought-after choice “C” is from the large group, mathematical probability would suggest exchanging choice “B” for choice “C”. The participant followed this suggestion and has elected to exchange choice “B” for choice “C” and the participant, in fact, has obtained the “value” in choice “C”.

Figure 2:
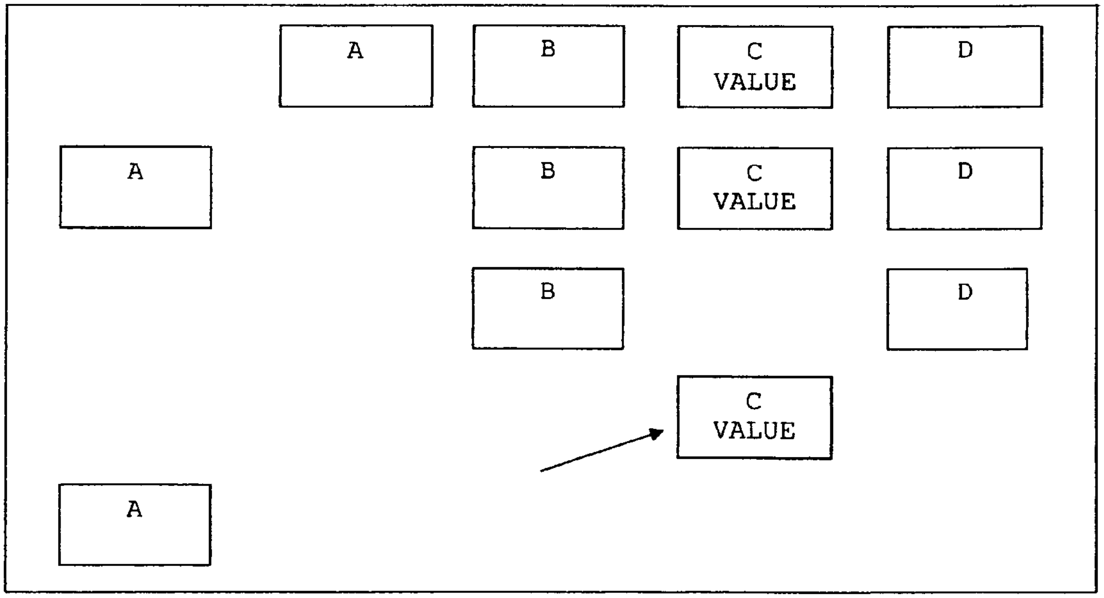

In FIG. 2 the participant created again a small group of “A”, but this time has selected “C”. After the random elimination, “C” and “A” remained. Since “A” is from the small group, the participant elects to keep the mandatory selection “C”, which is the likely and in fact the sought-after choice.

Figure 3:
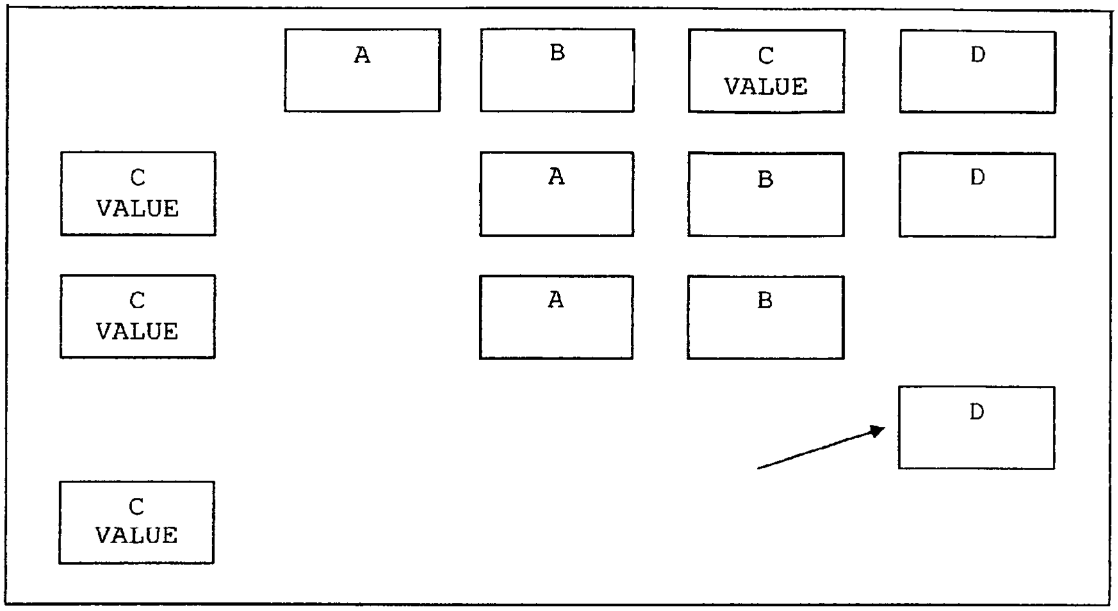

In FIG. 3 the participant created a small group of choice “C” and thereafter has selected choice “D”. After the random elimination, “C” and “D” have remained. Choice “C” is from the small group and probability dictates that the mandatory selection made by the participant from the large group of choices should more likely be the sought-after choice. The participant accordingly elects to stay with the mandatory selection “D”, but this time the participant did not get the “value” in choice “C”.

Figure 4:
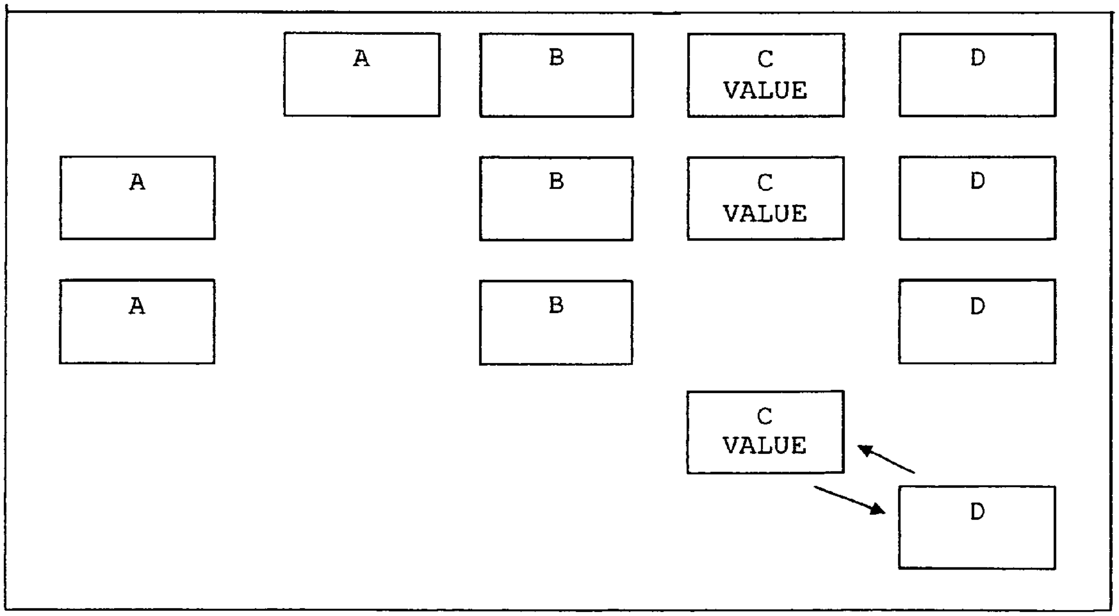

In FIG. 4 the participant created a small group of choice “A” and thereafter has selected “C”. The random elimination left again the choices “C” and “D” standing, but “D” survived the large group of choices which mathematically suggests an exchange of “C” for “D”. The participant again followed this suggestion, but did not get the “value” in “C”. Probability is no guaranty.

The present invention can comprise large group of choices with multiple participants, each can create small group of choices with wide range of options that make the competition among the participants more intellectually challenging.

The object of the invention is to provide mathematical logic for variety of games, shows, game-shows, e-games, lottery, selection in elections and other social activities where the options for selections are limited and elections are based on mere luck.

This invention could provide each participant in selection events the option of dividing any group of individuals in two groups and to elect every one in one of the two groups.

Although the foregoing invention has been described in some details by way of illustration and example for purposes of clarity and understanding, it will be readily apparent to those of ordinary skill in the art in light of the teaching of this invention, that certain changes and modifications may be made thereto without departing from the spirit or scope of the appended claims.

What is claimed is:

1. Apparatus for making a sought-after choice more likely to be obtained by a participant from a group of choices in a game based on mathematical probability using an electronic device, comprising the steps of asking the participant to make a mandatory selection of a single choice from the group of choices; permitting the participant to first divide the group of choices in two groups in order to create a small group, wherein the small group can be of a single choice and can also be of multiple choices; requiring the participant to make the mandatory selection of the single choice from the large group of choices; randomly eliminating by said electronic device all but two choices, wherein the two choices that survive the random elimination must include the sought-after choice and the mandatory selection of the single choice from the large group of choices, wherein if the mandatory selection of the single choice is also the sought-after choice any other choice must survive the random elimination, wherein one group of the two groups of choices must completely disappear after the random elimination; giving the participant an option to elect one out of the two choices.

2. The apparatus for making a sought-after choice more likely to be obtained according to claim 1, wherein the participant is more likely than not to obtain the sought-after choice by electing the choice that has survived the large group after the random elimination.

3. The apparatus for making a sought-after choice more likely to be obtained according to claim 1, wherein the participant is more likely than not to obtain the sought-after choice by electing the mandatory selection of the single choice rather than the choice that has survived the small group.

4. The apparatus for making a sought-after choice more likely to be obtained according to claim 1, wherein the selections and the probable election of the sought-after choice by the participant following the random elimination can be part of game apparatus, game-show, e-game, lottery, election and selection contests.

5. The apparatus for making a sought-after choice more likely to be obtained according to claim 4, wherein the sought-after choice can be obtained for holding or for disposing based on the options available to the participant.

6. The apparatus for making a sought-after choice more likely to be obtained according to claim 4, wherein there can be multiple participants competing to obtain the sought-after choice.

* * * * *